United States Patent [19]

Young

[11] 4,076,280
[45] Feb. 28, 1978

[54] CONDUIT COUPLING

[75] Inventor: James M. Young, Pittsburgh, Pa.

[73] Assignee: Robroy Industries, Verona, Pa.

[21] Appl. No.: 698,222

[22] Filed: Jun. 21, 1976

[51] Int. Cl.² .............................................. F16L 35/00
[52] U.S. Cl. ..................................... 285/39; 285/175;
285/334.5; 285/382.4; 285/386; 285/417
[58] Field of Search ..................... 285/334.5, 382.4, 39,
285/334.4, 386, 175, 417

[56] References Cited

U.S. PATENT DOCUMENTS

| 214,881 | 4/1879 | Cain | 285/382.4 |
|---|---|---|---|
| 284,350 | 9/1883 | Zistel | 285/334.5 X |
| 1,682,635 | 8/1928 | Smith | 285/382.4 X |
| 1,697,815 | 1/1929 | Hagstedt | 285/334.5 X |
| 3,534,988 | 10/1970 | Lindsey | 285/382.4 X |

FOREIGN PATENT DOCUMENTS

| 1,093,257 | 11/1967 | United Kingdom | 285/334.5 |

*Primary Examiner*—Dave W. Arola
*Attorney, Agent, or Firm*—Stanley J. Price, Jr.; John M. Adams

[57] ABSTRACT

A tubular body portion has an internally threaded portion and a cylindrical portion and includes an annular recess portion therebetween. The annular recess portion includes a first shoulder adjacent the threaded portion and a second shoulder adjacent the cylindrical portion. A circumferential cutting edge portion is provided at the juncture of the second shoulder and the adjacent cylindrical portion. A first conduit to be joined is extended through the cylindrical portion into substantially abutting relation with the first shoulder. A suitable expanding tool expands the end portion of the first conduit outwardly into the annular recess portion and against the cutting edge to produce a distinct gouge or circumferential cut therein. The coupling remains rotational relative to the first conduit with the end portion thereof expanded into the annular recess portion. A second conduit to be joined is threadedly advanced into the threaded end portion of the coupling by rotation of the coupling. The second conduit moves into underlapping relation with the expanded end portion of the first conduit and on continued advance urges the expanded end portion into further abutting relation with the annular recess portion and the cutting edge portion of the coupling so that additional portions of the expanded end thereof are rolled back into the annular recess portion to mechanically lock the first conduit to the coupling. Thus, the conduits are engaged to each other and to the coupling to provide a connection sufficient to resist axial forces tending to separate the conduits from the coupling.

11 Claims, 6 Drawing Figures

CONDUIT COUPLING

BACKGROUND OF THE INVENTION

1. Field of the Invention

This invention relates to an improved coupling for joining together the end portions of a pair of conduits and more particularly to a coupling that is securely engaged to the conduits to prevent separation of the conduits from the coupling when axial forces are applied to the conduits.

2. Description of the Prior Art

Conventional couplings for joining together electrical conduits, pipes and the like typically include a cylindrical body with an internally threaded portion for receiving the respective end portions of conduits to be joined together by the coupling. The coupling includes an internal passageway having threaded end portions or ridged sections to permit advancement of each conduit end portion through the passageway and into engagement therewith. The coupling is secured to the threaded end portion of one conduit, and then the engaged coupling and conduit are rotated to advance the other threaded conduit into the coupling to join together the conduits. However, with this arrangement because the ends of the coupling are threaded, the end portions of the conduits must rotate. This presents a considerable problem particularly in the case of long conduits and arcuately shaped conduits where it is not possible to rotate the conduits to effect coupling thereof.

A conventional coupling having threaded end portions is also expensive to manufacture. Once the respective threads or ridges are machined for both sections of the coupling, the versatility of the coupling is substantially reduced. Not only is the coupling limited to joining conduits of a fixed diameter, the threaded end portions of the conduits must be rotated to advance the conduits into meshing engagement with the respective internally threaded portions of the coupling.

U.S. Pat. No. 1,794,849 discloses an electric conduit coupling that includes an annular internal groove of a preselected depth that separates a threaded portion from a ridged portion of the coupling. A pipe end portion is inserted into the ridged end of the coupling until the end wall of the pipe engages a shoulder formed by the innermost thread of the threaded section of the coupling that abuts one side of the annular internal groove. A tapered punch is secured to the threaded end of the coupling and struck to spread the pipe into the recess formed by the annular internal groove. The adjoining threaded pipe is advanced in the threaded end of the coupling to abut the end of the pipe expanded into the annular internal groove. The end portions of the pipes are secured within the coupling by expanding one end portion into the internal annular groove and securing the other end portion by threaded engagement with the threaded portion of the couplings. Even though the end portions of the pipes are secured to the coupling, the end portions merely butt and are not secured to each other any may consequently be loosened from engagement with the coupling.

In United States application, Ser. No. 622,863 filed Oct. 16, 1975, entitled "Conduit Coupling", now abandoned, a coupling for joining together the end portions of conduits, pipes and the like is disclosed and includes a sleeve member having an internally threaded portion that is separated from a cylindrical passageway by a tapered annular portion. The diameter of the tapered annular portion progressively increases from the cylindrical passageway to the threaded portion. The end portion of a first conduit to be joined is extended through the small diameter end of the tapered annular portion and flared outwardly into the annular portion. The flared end portion is rotatable relative to the sleeve but is restrained from axial movement out of the sleeve by contact with the shoulder of the tapered annular portion. A second conduit is threadedly engaged to the threaded end portion of the sleeve by rotation of the sleeve. The end portion of the second conduit is urged into underlapping engagement with the flared end portion of the first conduit, in turn, urging the first conduit into engagement with the sleeve annular portion. With this arrangement the first conduit is secured within the sleeve.

There is need for a coupling for joining the end portions of pipes, conduits and the like in which the coupling joins the conduit end portions in locking engagement sufficiently to withstand axial forces that when applied to the conduits tend to separate the conduits from connection with the coupling. While it has been suggested to threadedly secure the conduit end portions to the coupling and to provide locking engagement of the conduits to the coupling, the prior art devices require the conduits to be rotated into the coupling.

SUMMARY OF THE INVENTION

In accordance with the present invention, there is provided a coupling for joining together the end portions of a pair of conduits that includes a cylindrical body portion having an internally threaded portion and an internally unthreaded or a cylindrical portion forming a passageway. An annular recess portion separates the threaded portion from the cylindrical portion. The annular recess portion has a first shoulder positioned adjacent the threaded portion and a second shoulder at the opposite end portion adjacent the cylindrical portion having a circumferential cutting edge portion projecting into the annular recess portion. The end portion of the first conduit to be engaged within the coupling is extended through the cylindrical portion and includes an end portion that is expanded outwardly into the annular recess portion and against the cutting edge. A second conduit having a threaded end portion is advanced into the threaded portion of the coupling by rotation of the coupling. The end portion of the second conduit extends into the expanded end portion further urging the first conduit into abutting relation with the coupling body portion and further into cutting engagement with the cutting edge portion.

Rotation of the coupling advances the second conduit into the first conduit to initially urge the first conduit rearwardly within the coupling so that the cutting edge portion of the coupling shoulder cuts further into the outer surface of the first conduit end portion and peels back or gouges a portion of the surface. The conduit moves rearwardly within the coupling until the conduit reaches a position within the coupling where the expanded end portion is restrained from further axial movement and further expansion or deformation. With this arrangement the conduits are securely engaged to each other within the coupling and the first conduit is locked by the second conduit within the annular recess portion and is engaged by the coupling circumferential cutting edge.

Initially, the end portion of the first conduit is positioned within the coupling adjacent the shoulder thereof at the threaded end portion of the coupling. A suitable expanding tool is advanced through the threaded portion of the coupling and into the first conduit to outwardly expand the end portion of the first conduit into the annular recess portion and into cutting or gouging relation with the circumferential cutting edge.

With the end portion of the first conduit expanded into the annular recess portion of the coupling and deformed by the cutting edge, the second conduit having a threaded end portion is advanced into the coupling by rotation of the coupling relative to the conduit. With this arrangement the second conduit is secured to the coupling without the need to rotate the conduit. The threaded end portion of the second conduit extends into underlapping relation with the expanded end portion of the first conduit. Axial movement of the second conduit into the coupling further expands the first conduit outwardly into frictional engagement with the annular recess portion. Also axial advancement of the second conduit urges the first conduit rearwardly relative to the coupling so that the coupling shoulder cutting edge portion further engages the outer surface of the first conduit. In this manner a portion of the wall of the first conduit is gouged, rolled back or peeled away into the annular recess portion between the outer surface of the first conduit and the body portion of the coupling. Thus, by the engagement of the first conduit expanded end portion with the threaded end portion of the second conduit and the body portion of the coupling and the cutting engagement of the coupling cutting edge portion to the expanded end portion of the first conduit, the first conduit is locked to the coupling to prevent axial movement therebetween.

The threaded end portion of the second conduit positioned in underlapping, abutting relation with the first conduit end portion exerts an outward force upon the expanded end portion of the first conduit to lock the expanded end portion in engagement with the body portion of the coupling. In addition, axial forces applied to the first conduit tending to separate it from the coupling further urge the cutting edge portion into the outer wall of the first conduit. This tends to increase the material within the annular recess portion and the mechanical bond between the first conduit and the coupling.

Accordingly, the principle object of the present invention is to provide a coupling for conduits, pipes and the like that permits joining the end portions of the conduits within the coupling to lock the conduits to each other and to the coupling so that when axial forces are applied to the conduits the conduits remain connected to the coupling.

A further object of the present invention is to provide a coupling for joining together the end portions of a pair of conduits by interlocking the conduits within a coupling and engaging each of the conduits to the coupling so that the joined conduits may withstand substantial vibration and axial separating forces without loosening their engagement to the coupling.

Another object of the present invention is to provide a coupling for joining together the end portions of a pair of couplings by providing an engagement of the conduits to each other in the coupling and to the coupling.

These and other objects of this invention will be more completely disclosed and described in the following specification, the accompanying drawings and the appended claims.

DESCRIPTION OF THE PREFERRED EMBODIMENTS

Figure 1:
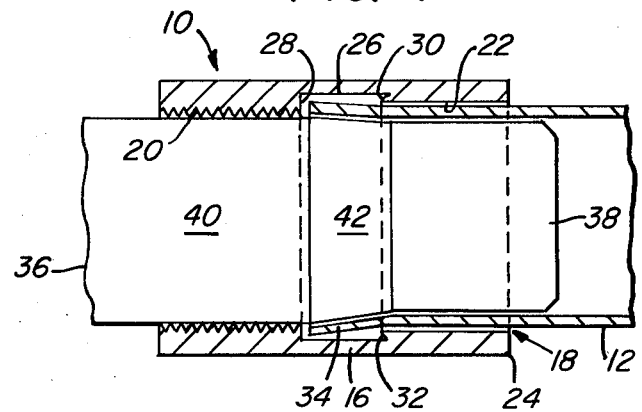
FIG. 1 is a sectional view of an improved conduit coupling having an annular recess portion with a circumferential cutting edge, illustrating a suitable tool positioned in the coupling for expanding the end portion of a first conduit into the annular recess portion.
Figure 2:
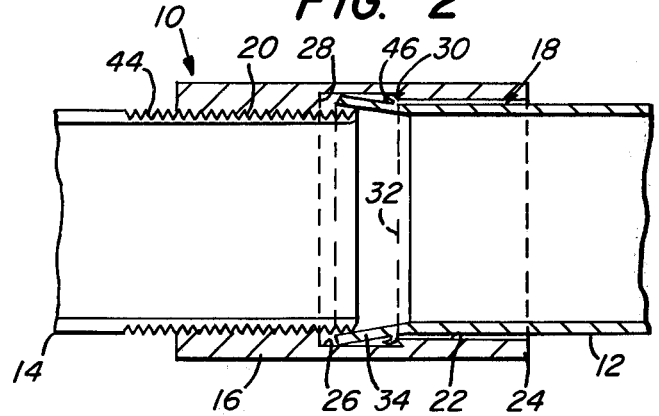
FIG. 2 is a sectional view of the improved conduit coupling similar to FIG. 1, illustrating the threaded end portion of a second conduit secured to the coupling and positioned in abutting, underlapping relation within the expanded end portion of the first conduit and the circumferential cutting edge engaging a portion of the outer wall of the first conduit.
Figure 3:
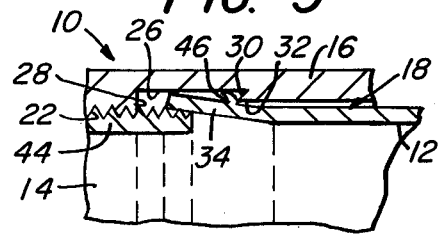
FIG. 3 is an enlarged fragmentary, sectional view of the annular recess portion of the coupling, illustrating the first conduit end portion locked to the coupling by engagement with the threaded end portion of the second conduit and the circumferential cutting edge with the cut portion positioned in the annular recess portion to rigidly secure the first conduit to the coupling.

Referring to the drawings and more particularly to FIGS. 1, 2 and 3, there is illustrated a coupling generally designated by the numeral 10 for joining together the end portions of a pair of conduits 12 and 14. The coupling 10 is formed from a sleeve member having a cylindrical body portion 16 with a passageway generally designated by the numeral 18. The passageway 18 includes an internally threaded end portion 20 and a cylindrical portion 22. The cylindrical portion 22 extends from coupling end portion 24 to intermediate the passageway 18 and is divided from the threaded end portion 20 by an annular recess portion 26 formed in the cylindrical body portion 16. The threaded end portion 20 and the cylindrical portion 22 of the coupling are coaxially aligned.

The annular recess portion 26 includes a shoulder 28 adjacent the threaded end portion 20. The shoulder 28 extends substantially at a right angle to the longitudinal axis of the passageway 18. The annular recess portion 26 also includes adjacent the cylindrical portion 22, a shoulder 30 that extends outwardly from the body portion 16 at an acute angle to form a circumferential, perferably, case hardened, cutting edge 32 extending into the passageway 18. As illustrated in FIG. 1, the diameter of the coupling cylindrical portion 22 is greater than the diameter of the coupling threaded portion 20 to facilitate insertion and expansion of the end portion of the conduit 12 within the annular recess portion 26 in a manner hereinafter explained.

End portion 34 of conduit 12 is initially extended through the coupling end portion 24 into the annular recess portion 26. The end portion 34 is positioned in substantially abutting relation with the shoulder 28 of the recess 26. The conduit 12 has a diameter greater than the diameter of the coupling threaded end portion 20 so that the conduit end portion 34 is prevented from advancing into the coupling threaded end portion 20.

As illustrated in FIG. 1, the conduit end portion 34 is expanded outwardly into the annular recess portion 26 by a suitable expanding tool 36. The expanding tool 36 has an end portion 38 of a diameter to permit insertion through the coupling threaded end portion 20 and into the conduit 12. The expanding tool 36 has a shank portion 40 with a diameter greater than that of end portion 38 but less than the diameter of the coupling threaded end portion 20. A collar 42 is provided on the expanding tool 36 between the end portion 38 and shank portion 40. The collar 42 tapers downwardly from the shank portion 40 to the end portion 38. With this arrangement, as the expanding tool end portion 38 passes into the conduit end portion 34 within the coupling 10, the conduit end portion 34 is expanded outwardly into the annular recess portion 26 by the tapered collar 42.

As the collar 42 advances into the conduit 12, an outward force is exerted upon the end portion 34 to urge the end portion 34 outwardly into the annular recess portion 26. The conduit 12 is expanded to the extent that the end portion 34 is positioned axially adjacent to the coupling threaded portion 20. Thus, the end portion 34 is positioned within the annular recess portion 26 closely adjacent to the shoulder 28. In this position the coupling 10 remains rotatable relative to the conduit 12. The conduit 12, however, is axially movable within the coupling 10 between the shoulder 28 and the circumferential cutting edge 32 of shoulder 30. Thus, the flared conduit end portion 34 is restrained from axial movement out of the recess 26 between shoulders 28 and 30.

As illustrated in FIGS. 2 and 3, once the end portion 34 has been expanded into the annular recess portion 26, the conduit 14 having an externally threaded end portion 44 is advanced into engagement with the coupling threaded end portion 20 by rotation of the coupling 10 relative to the conduit 14. In this manner the conduit 14 is threadedly engaged to the coupling 10 without requiring rotation of the conduit 14. This is particularly advantageous for conduits having an extended length making it difficult to threadedly advance the conduit into the coupling or for conduits having arcuately shaped end portions.

Thus, rotation of the coupling 10 on the threaded end portion 44 advances the conduit 14 into the coupling. Continued rotation of coupling 10 urges the conduit end portion 44 into underlapping contact with the conduit end portion 34 to further outwardly expand conduit 12 into contact with annular recess 26. In addition to the engagement of the end portion 34 with the edge 32 by the expansion step, advancement of conduit end portion 44 in the coupling 10 urges end portion 34 rearwardly from shoulder 28 into further engagement with the cutting edge 32. In this manner, as when the end portion 34 is expanded, the edge 32 cuts into the outer metal surface of conduit end portion 34 as the conduit 14 moves conduit 12 toward coupling end portion 24. The cutting action peels back a portion 46 from the surface of the metal conduit 12.

The cut portion 46 is directed into the annular recess portion 26 between the conduit end portion 34 and the coupling body portion 16. This adds additional material within the annular recess portion to frictionally engage the conduit 12 to the coupling 10 and effect locking engagement of the conduit to the coupling. In addition, an axial force applied to the conduit 12 tending to separate it from engagement with the coupling 10 further urges the cutting edge 32 into cutting engagement with the expanded end portion 34 thereby increasing the amount of material contained within the recess 26 and the mechanical bond between conduit 12 and coupling 10. Thus, the conduit 12 is securely locked to the coupling 10 by engagement of end portion 34 with threaded end portion 44 and body portion 16 and cutting edge 32.

Figure 4:
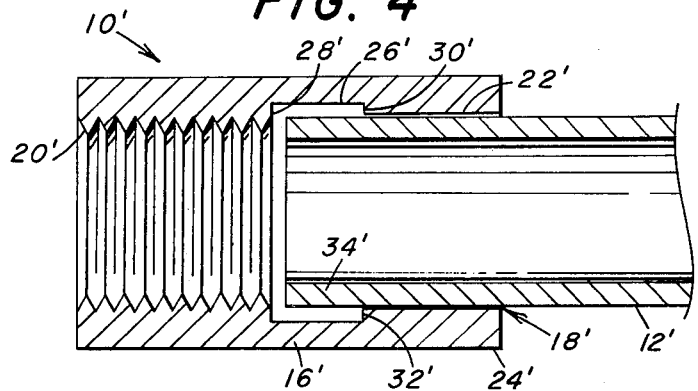
FIG. 4 is a sectional view of another improved conduit coupling of this invention having an annular recess portion with a circumferential cutting edge, illustrating a segment of unthreaded conduit in position within the coupling prior to expanding an end portion of the unthreaded conduit.
Figure 5:
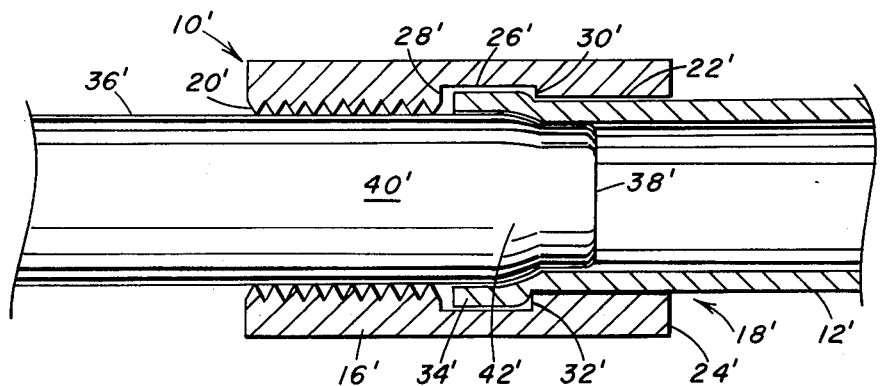
FIG. 5 is a view similar to FIG. 4, illustrating a suitable tool positioned in the coupling for expanding the end portion of the unthreaded conduit into the annular recess portion of the coupling and against the cutting edge.
Figure 6:
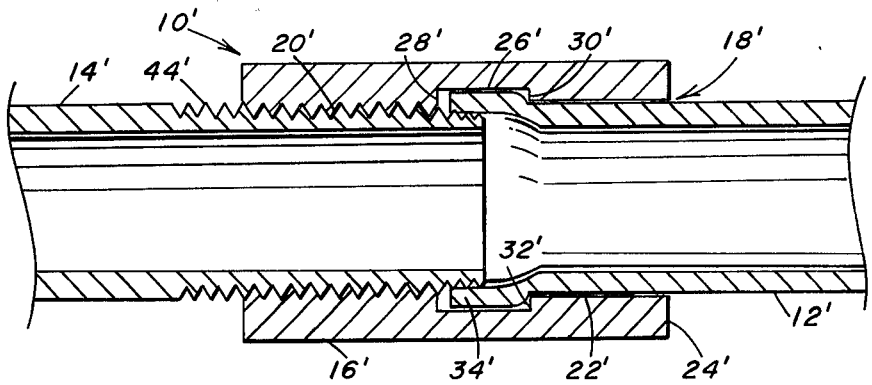
FIG. 6 is a view similar to FIG. 5, illustrating the expansion tool removed and the threaded end portion of a threaded conduit secured to the coupling and positioned in abutting, underlapping relation within the expanded end portion of the unthreaded conduit.

Referring now to FIGS. 4 and 6, there is illustrated a further embodiment of this invention wherein right angle shoulder 30' replaces acute angle shoulder 30 of FIGS. 1-3, and accordingly, terminates adjacent corresponding cylindrical portion 22' with a right angle cutting edge 32', in lieu of acute angle cutting edge 32. In other respects the coupling, conduits and expansion tool of FIGS. 4-6 and their method of assembly and mode of use are substantially identical with those of FIGS. 1-3 and, therefore, for the sake of brievity, corresponding primed numerals are therein applied to like parts, with reference had to the description pertaining to FIGS. 1-3 for a thorough understanding of the latter embodiment.

However, as will be apparent from FIG. 6 as compared to FIGS. 2 and 3, a distinguishing feature that inhers in the latter embodiment is that a distinct peeling back of the surface of the unthreaded conduit is not per se relied upon to produce or increase mechanical bonding. Rather, while a distinct gouge is formed around the periphery of the unthreaded conduit by the cutting edge 32' when the conduit is initially expanded, thereafter a rolling back or deformation of the wall of the conduit into recess 26', due to axial forces, is relied upon for increased bonding rather than a discrete cutting into or pulling back of surface portions of the conduit. Further, as illustrated in FIG. 4, with the expanding tool 36' wedging the conduit end portion into gouging relation with the cutting edge 32' the end portion 34' is axially spaced from the shoulder 28' within the annular recess 26'. When the tool 36' is extracted, the conduit 12' remains tightly wedged within the coupling 10'. By applying a light tap to the end of coupling 10' adjacent the shoulder 28', the coupling 10' moves axially on conduit 12' to permit the coupling 10' to rotate relative to conduit 12' with very little lateral movement. This permits the conduit 14' to be threaded into the coupling 10' by rotation of the coupling.

With the conduit 14, 14' threadedly engaged to the coupling 10, 10' and the conduit 12, 12' locked thereto by engagement with cutting edge 32, 32' and conduit end portion 44, 44', the conduits 12, 12' and 14, 14' are axially immovable and nonrotatable relative to the coupling 10, 10'. Axial separating forces applied to conduit 12, 12' further urge the cutting edge 32, 32' of shoulder 30, 30' into contact with the conduit 12, 12' adding additional material within recess 26, 26' to strengthen the mechanical bond between coupling 10, 10' and conduit 12, 12'. It will be apparent that the coupling 10, 10' of the present invention permits efficient joining of the conduits 12, 12' and 14, 14' in a manner to overcome axial forces that when applied to the conduits tend to separate the conduits from the coupling. By the addition of the circumferential cutting edge 32, 32' to the coupling 10, 10', the mechanical bond developed between the coupling and the conduit 12, 12' increases with an increase in the axial force applied to conduit 12, 12'. Thus, the greater the axial force applied to the conduit 12, 12' the more rigid the engagement of the conduit 12, 12' to the coupling 10, 10'.

According to the provisions of the Patent Statutes, I have explained the principle, preferred construction and mode of operation of my invention and have illustrated and described what I now consider to represent its best embodiments. However, it should be understood that within the scope of the appended claims, the invention may be practiced otherwise than as specifically illustrated and described.

I claim:

1. A coupling for joining together the end portions of a pair of conduits comprising,
   a cylindrical body portion,
   said cylindrical body portion having a passageway extending therethrough, said passageway having an internally threaded end portion an intermediate annular recessed portion and a cylindrical end portion,
   said intermediate annular recessed portion separating said threaded end portion from said cylindrical end portion,
   said intermediate annular recessed portion forming a first shoulder adjacent said threaded end portion and a second shoulder adjacent said cylindrical end portion,
   said second shoulder having a circumferential cutting edge portion projecting into said annular recessed portion,
   said passageway cylindrical end portion arranged to receive an end portion of a first conduit having an outer diameter less than the internal diameter of said passageway cylindrical end portion, said first conduit end portion arranged to be expanded into said passageway intermediate annular recessed portion and axially spaced from said first shoulder to permit said cylindrical body portion to move axially on the first conduit for rotation of said cylindrical body portion relative to the first conduit, and
   said passageway threaded end portion arranged to threadedly receive an externally threaded end portion of a second conduit in a manner that said externally threaded end portion extends into and underlaps the expanded end portion of said first conduit upon rotation of said cylindrical body portion to maintain said first conduit expanded end portion of said first conduit in abutting relation with said passageway intermediate annular recessed portion second shoulder to securely join together said pair of conduits in locking engagement with said coupling.

2. The coupling for joining together the end portions of a pair of conduits as set forth in claim 1 which includes,
   said passageway internally threaded end portion having a diameter less than the diameter of said cylindrical end portion to facilitate advancement of said second conduit upon rotation of said cylindrical body portion into underlapping engagement with the expanded end portion of the first conduit.

3. The coupling for joining together the end portions of a pair of conduits as set forth in claim 1 which includes,
   said passageway intermediate annular recessed portion having a diameter greater than the diameter of said internally threaded end portion so that upon expansion of the first conduit end portion by said second conduit a gouge is formed around the periphery thereof by said cutting edge portion of said second shoulder to mechanically lock the first conduit to said cylindrical body portion.

4. The coupling for joining together the end portions of a pair of conduits as set forth in claim 1 which includes,
   said cutting edge portion projecting at an acute angle from said cylindrical body portion into said annular recessed portion, and
   said cutting edge portion being operable to engage in cutting relation the expanded end portion of the first conduit to peel back a portion thereof into said annular recessed portion and thereby frictionally engage the first conduit to said cylindrical body portion.

5. The coupling for joining together the end portions of a pair of conduits as set forth in claim 1 which includes,
   said cutting edge portion arranged to cut into the outer surface of said first conduit upon movement of the first conduit away from said first shoulder and direct a cut segment of said first conduit into said annular recessed portion between said first conduit and said cylindrical body portion to mechanically bond the first conduit to said coupling.

6. The coupling for joining together the end portions of a pair of conduits as set forth in claim 1 which includes,
   said annular recessed portion being arranged to receive the end portion of the first conduit expanded outwardly into substantially abutting relation with said annular recessed portion by axial advancement of a suitable expanding device through said passageway threaded end portion into the first conduit.

7. The coupling for joining together the end portions of a pair of conduits as set forth in claim 1 which includes,
   said annular recessed portion arranged to receive the first conduit with the expanded end portion thereof rigidly retained by the second conduit end portion in locking engagement with said cylindrical body portion.

8. The coupling for joining together the end portions of a pair of conduits as set forth in claim 1 which includes,
   said cutting edge portion arranged to engage in cutting engagement the metal outer surface of the first conduit upon the application of an axial force thereto tending to separate the first conduit from said cylindrical body portion, and
   a portion of said cut metal being peeled back to fill said annular recessed portion between the first conduit and said cylindrical body portion to lock the first conduit to said coupling.

9. The coupling for joining together the end portions of a pair of conduits as set forth in claim 8 which includes,
   said cutting edge portion arranged to dislodge a greater portion of the metal outer surface from the first conduit as the axial separating force applied thereto increases to increase the locking engagement between the first conduit and said coupling.

10. The coupling for joining together the end portions of a pair of conduits as set forth in claim 1 which includes, said passageway recessed portion second shoulder extending at a substantially right angle to said cylindrical portion of said coupling.

11. The coupling for joining together the end portions of a pair of conduits as set forth in claim 1 which includes, said passageway recessed portion first shoulder being axially spaced from the end portion of the first conduit expanded into said annular recessed portion so that said cylindrical body portion is movable axially on the first conduit to permit rotation of said cylindrical body portion relative thereto to advance the second conduit into said threaded portion.

* * * * *